US012600455B2

(12) United States Patent
K V et al.

(10) Patent No.: US 12,600,455 B2
(45) Date of Patent: Apr. 14, 2026

(54) AIRCRAFT CARGO DOOR ACTUATION SYSTEM WITH FIRST ACTUATOR AND SECOND ACTUATOR

(71) Applicants: Airbus (S.A.S.), Blagnac Cedex (FR); Airbus Operations GmbH, Hamburg (DE); Airbus Operations (S.A.S.), Toulouse (FR)

(72) Inventors: Mayur K V, Bristol (GB); Nishith Ramaraja, Bristol (GB); Marc Antonio Bentivoglio, Toulouse (FR); Cristobal Federico Brito Maur, Hamburg (DE); Benoit Thomas, Toulouse (FR); Dominique Grisel, Blagnac (FR); Jayaparthan Jagadeesan, Toulouse (FR); Marco Lutz, Hamburg (DE)

(73) Assignees: Airbus (S.A.S.), Blagnac (FR); Airbus Operations GmbH, Hamburg (DE); Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 18/926,793

(22) Filed: Oct. 25, 2024

(65) Prior Publication Data

US 2025/0136264 A1 May 1, 2025

(30) Foreign Application Priority Data

Oct. 27, 2023 (IN) .............................. 202311073436

(51) Int. Cl.
*B64C 1/14* (2006.01)

(52) U.S. Cl.
CPC .................................. *B64C 1/1415* (2013.01)

(58) Field of Classification Search
CPC ........ B64C 1/1415; B64C 1/14; B64C 1/1407
See application file for complete search history.

(56) References Cited

U.S. PATENT DOCUMENTS

| | | | |
|---|---|---|---|
| 3,416,757 A | 12/1968 | Alex | |
| 4,440,364 A | 4/1984 | Cone | |
| 4,497,462 A | 2/1985 | Hamatani | |
| 6,457,675 B1 | 10/2002 | Plude | |

(Continued)

FOREIGN PATENT DOCUMENTS

| | | |
|---|---|---|
| CN | 105667757 B | 11/2017 |
| CN | 113335494 A | 9/2021 |

(Continued)

OTHER PUBLICATIONS

United Kingdom Intellectual Property Office Search and Examination Report issued in Application No. GB2319058.0, dated May 31, 2024, 7 pages.

(Continued)

*Primary Examiner* — Arfan Y. Sinaki
(74) *Attorney, Agent, or Firm* — KDW Firm PLLC

(57) ABSTRACT

An actuation system for a cargo door of an aircraft. The cargo door covers an opening into a cargo bay when it is in a closed position. The actuation system includes a first actuator configured to outwardly rotate the cargo door from the closed position to a first open position, and a second actuator configured to outwardly rotate the cargo door from the first open position to a second open position.

20 Claims, 16 Drawing Sheets

(56)                    References Cited

U.S. PATENT DOCUMENTS

| | | | | |
|---|---|---|---|---|
| 8,074,930 | B2 | 12/2011 | Sibley | |
| 8,215,581 | B1 | 7/2012 | Kulesha | |
| 9,010,685 | B2 * | 4/2015 | Muller-Dauch | ...... B64C 1/1415 |
| | | | | 244/118.3 |
| 12,252,920 | B2 * | 3/2025 | Meilhan | ................ E05F 15/611 |
| 2002/0060270 | A1 * | 5/2002 | Buchs | ................... B64C 1/1407 |
| | | | | 244/129.5 |
| 2008/0099605 | A1 | 5/2008 | Yada et al. | |
| 2013/0284855 | A1 | 10/2013 | Müller-Dauch et al. | |
| 2015/0267724 | A1 | 9/2015 | Dyer | |
| 2019/0032377 | A1 | 1/2019 | Dyer | |
| 2020/0018096 | A1 | 1/2020 | Dyer | |
| 2025/0136264 | A1 | 5/2025 | K V et al. | |
| 2025/0136265 | A1 * | 5/2025 | K V | ...................... B64C 1/1415 |

FOREIGN PATENT DOCUMENTS

| | | | |
|---|---|---|---|
| CN | 218907591 | U | 4/2023 |
| EP | 0105082 | A2 | 4/1984 |
| EP | 1270405 | A2 | 1/2003 |
| EP | 3040267 | A1 | 7/2016 |

OTHER PUBLICATIONS

United Kingdom Intellectual Property Office Search and Examination Report issued in Application No. GB2319059.8, dated Jun. 5, 2024, 6 pages.
Extended European Search Report for EP Application No. 24205096.1, dated Mar. 11, 2025, 11 pages.
Extended European Search Report for EP Application No. 24205097.9, dated Mar. 11, 2025, 14 pages.

\* cited by examiner

35

35a
35b
35c

35

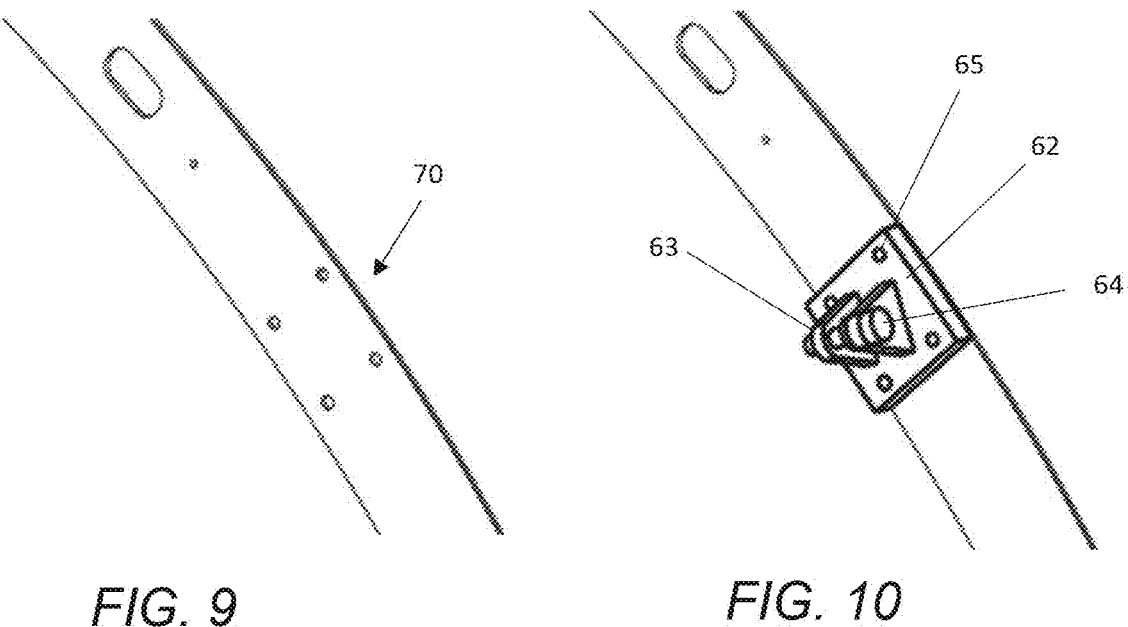
FIG. 9                    FIG. 10
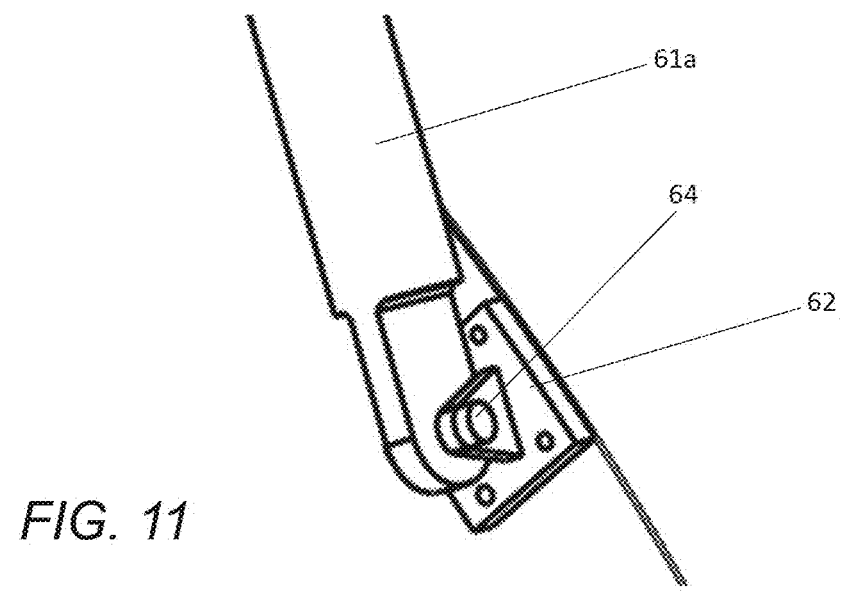
FIG. 11

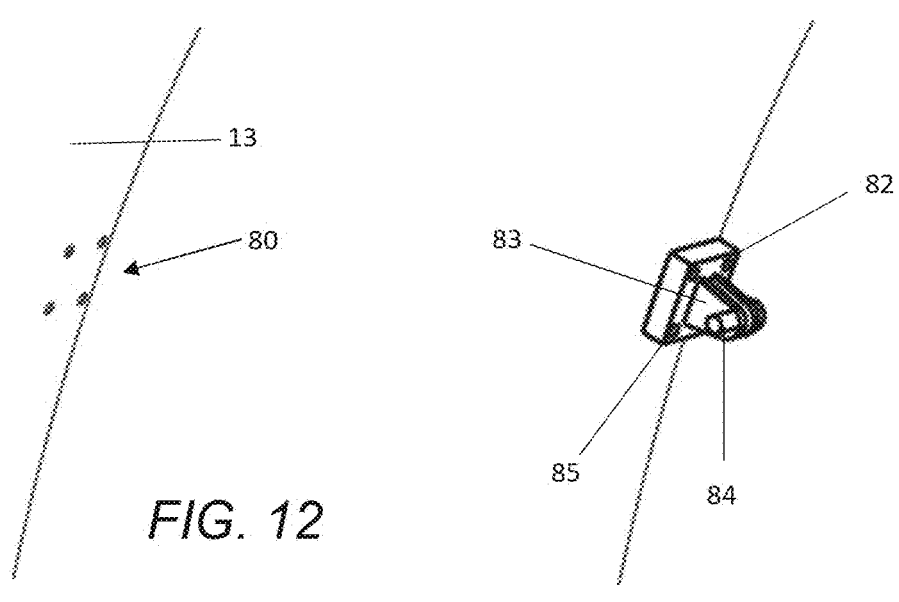
*FIG. 12*
*FIG. 13*
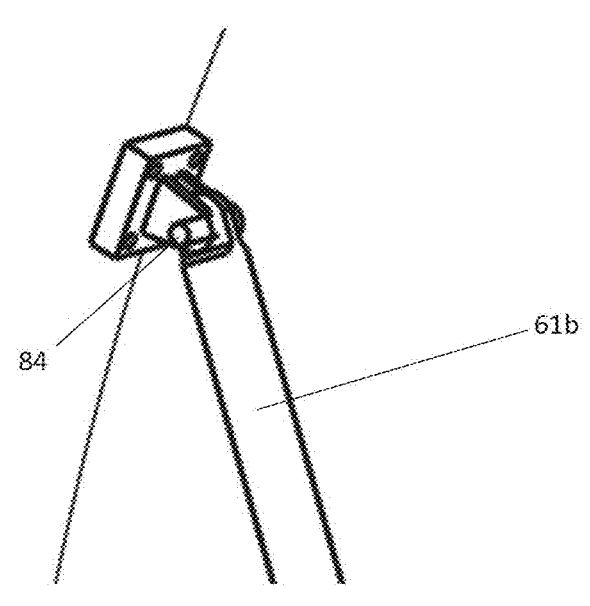
*FIG. 14*

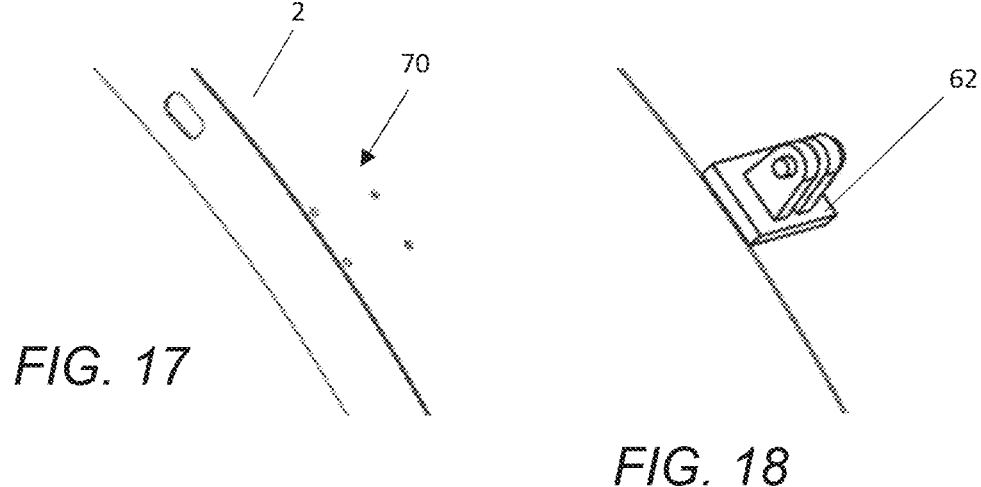
*FIG. 17*
*FIG. 18*
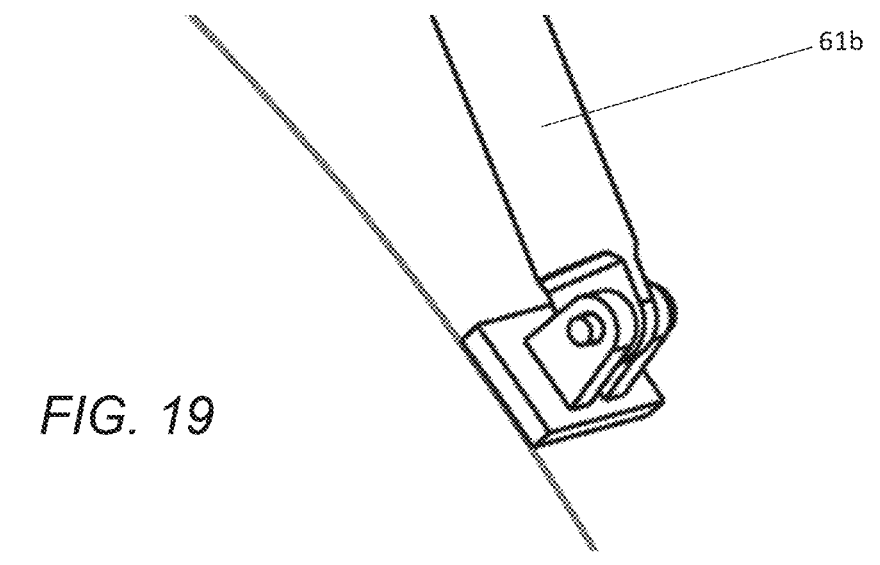
*FIG. 19*

AIRCRAFT CARGO DOOR ACTUATION SYSTEM WITH FIRST ACTUATOR AND SECOND ACTUATOR

FIELD OF THE INVENTION

The present invention relates to an actuation system for a cargo door of an aircraft, a method of opening a cargo door of an aircraft, and an aircraft with a cargo door and associated actuation system.

BACKGROUND OF THE INVENTION

U.S. Pat. No. 6,457,675B1 discloses a door actuation system for an outwardly opening cargo door. The cargo door is operable to open to two positions: a canopy position in which the cargo door is generally outright thereby providing an overhang over the door opening, and a fully opened position in which the cargo door is substantially vertical to maximize the cargo opening.

SUMMARY OF THE INVENTION

A first aspect of the invention provides an actuation system for a cargo door of an aircraft, wherein the cargo door covers an opening into a cargo bay when it is in a closed position, the actuation system comprising: a first actuator configured to outwardly rotate the cargo door by more than 40 degrees from the closed position to a first open position; and a second actuator configured to outwardly rotate the cargo door from the first open position to a second open position.

Optionally the actuators are configured to receive power from different and independent power sources.

Optionally the actuation system further comprises a first power source configured to supply power to the first actuator which can be used by the first actuator to outwardly rotate the cargo door, wherein the second actuator is configured to receive power from a second power source which can be used by the second actuator to outwardly rotate the cargo door.

Optionally the first power source is carried by the aircraft and the second power source is not carried by the aircraft.

Optionally the first actuator comprises a rotary actuator and the second actuator comprises a linear actuator.

Optionally the linear actuator has a first end coupled to the rotary actuator and a second end coupled to the cargo door; the rotary actuator is configured to rotate the cargo door by moving the first end of the linear actuator; and the linear actuator is configured to rotate the cargo door by increasing a distance between its first and second ends.

Optionally the first actuator is configured to receive electrical power from an electrical power source which can be used by the first actuator to rotate the cargo door.

Optionally the second actuator is configured to receive electrical power from an electrical power source which can be used by the second actuator to rotate the cargo door.

Optionally the actuators are configured to be controlled independently of each other.

A further aspect of the invention provides an aircraft comprising a cargo door; and an actuation system according to the preceding aspect configured to open the cargo door.

Optionally the aircraft further comprises: a body with an opening into a cargo bay, wherein the cargo door covers the opening when it is in the closed position.

Optionally the aircraft further comprises a first power source configured to supply power to the first actuator which can be used by the first actuator to outwardly rotate the cargo door, wherein the second actuator is configured to receive power from a second power source not carried by the aircraft.

Optionally the cargo door rotates by more than 50 degrees or more than 60 degrees from the closed position to the first open position.

Optionally the cargo door rotates by more than 30 degrees or more than 40 degrees from the first open position to the second open position.

Optionally a total rotation from the closed position to the second open position is more than 100 degrees or more than 110 degrees.

A further aspect of the invention provides a method of opening a cargo door of an aircraft, the method comprising: outwardly rotating the cargo door by more than 40 degrees with a first actuator from a closed position to a first open position, wherein the cargo door covers an opening into a cargo bay when it is in the closed position; then outwardly rotating the cargo door with a second actuator from the first open position to a second open position.

Optionally the actuators receive power from different and independent power sources.

Optionally the first actuator receives power from a first power source to rotate the cargo door, and the second actuator receives power from a second power source to rotate the cargo door.

Optionally the first power source is carried by the aircraft and the second power source is not carried by the aircraft.

Optionally the actuators are operated independently of each other.

Optionally the first actuator is controlled by a first control signal, and the second actuator is controlled by a second control signal.

A further aspect of the invention provides an actuation system for a cargo door of an aircraft, wherein the cargo door covers an opening into a cargo bay when it is in a closed position, the actuation system comprising: a rotary actuator configured to outwardly rotate the cargo door; and a linear actuator configured to outwardly rotate the cargo door independently of the rotary actuator.

A further aspect of the invention provides an actuation system for a cargo door of an aircraft, wherein the cargo door covers an opening into a cargo bay when it is in a closed position, the actuation system comprising: a rotary actuator configured to outwardly rotate the cargo door from the closed position to a first open position; and a linear actuator configured to outwardly rotate the cargo door from the first open position to a second open position, wherein the linear actuator has a first end coupled to the rotary actuator and a second end coupled to the cargo door; the rotary actuator is configured to rotate the cargo door by moving the first end of the linear actuator; and the linear actuator is configured to rotate the cargo door by increasing a distance between its first and second ends.

BRIEF DESCRIPTION OF THE DRAWINGS

Embodiments of the invention will now be described with reference to the accompanying drawings, in which:

FIG. 9 shows fastener holes in the door frame of the fuselage;

FIG. 10 shows a first bracket attached to the fuselage;

FIG. 11 shows the interface between the first end of the actuator rod and the fuselage;

FIG. 12 shows fastener holes in the inside face of the cargo door;

FIG. 13 shows a second bracket attached to the cargo door;

FIG. 14 shows the interface between the second end of the actuator rod and the cargo door;

FIG. 17 shows fastener holes in the fuselage;

FIG. 18 shows a first bracket attached to the fuselage;

FIG. 19 shows the interface between the first end of the actuator rod and the fuselage;

DETAILED DESCRIPTION OF EMBODIMENT(S)

The embodiments below facilitate wide opening of an aircraft cargo door whilst also reducing the strain placed on the rest of the aircraft. A pair of independently operable actuators are provided, each configured to outwardly open the cargo door over a different range of angular movement.

Figure 1:
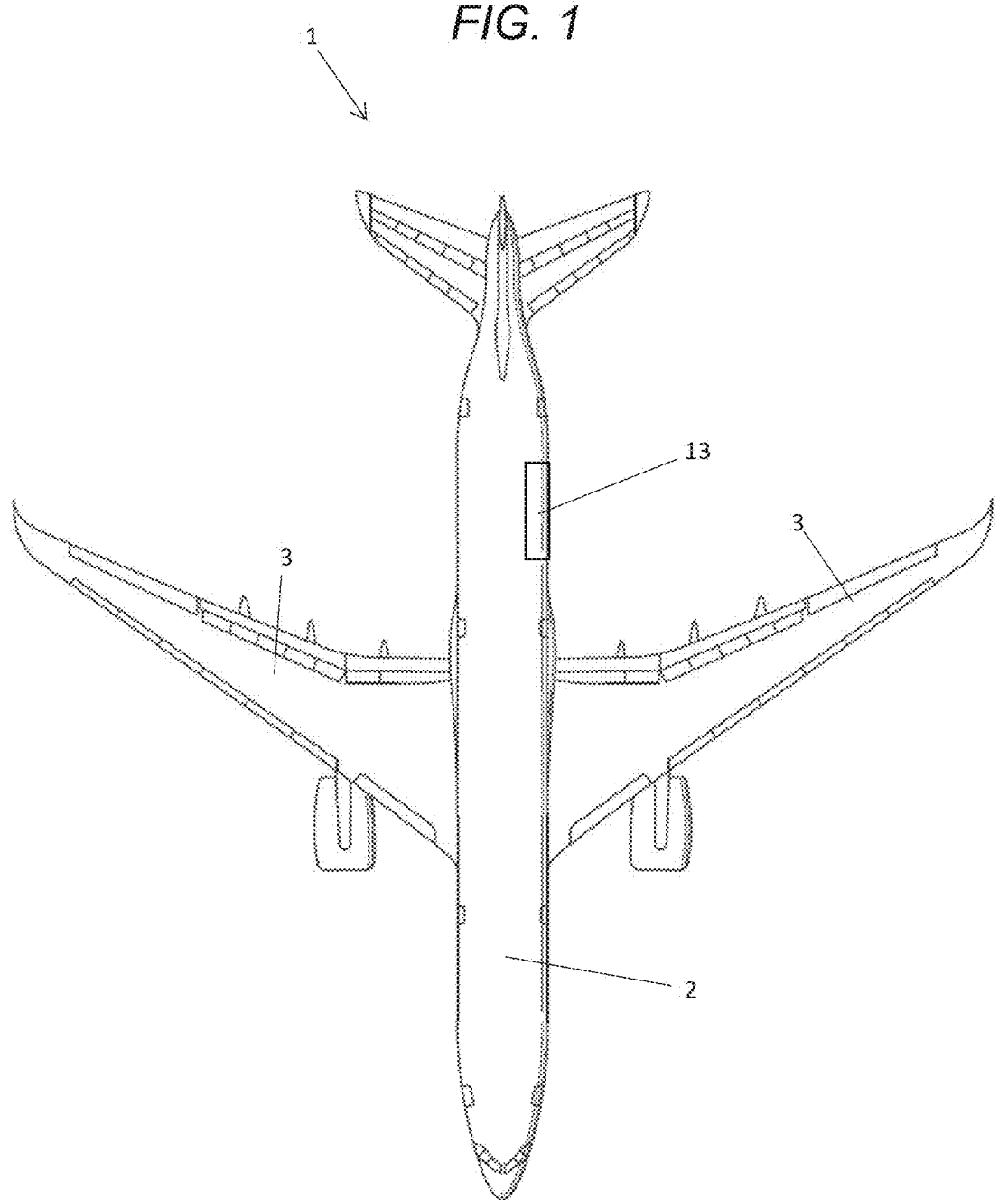
FIG. 1 is a plan view of a freighter aircraft.
Figure 2:
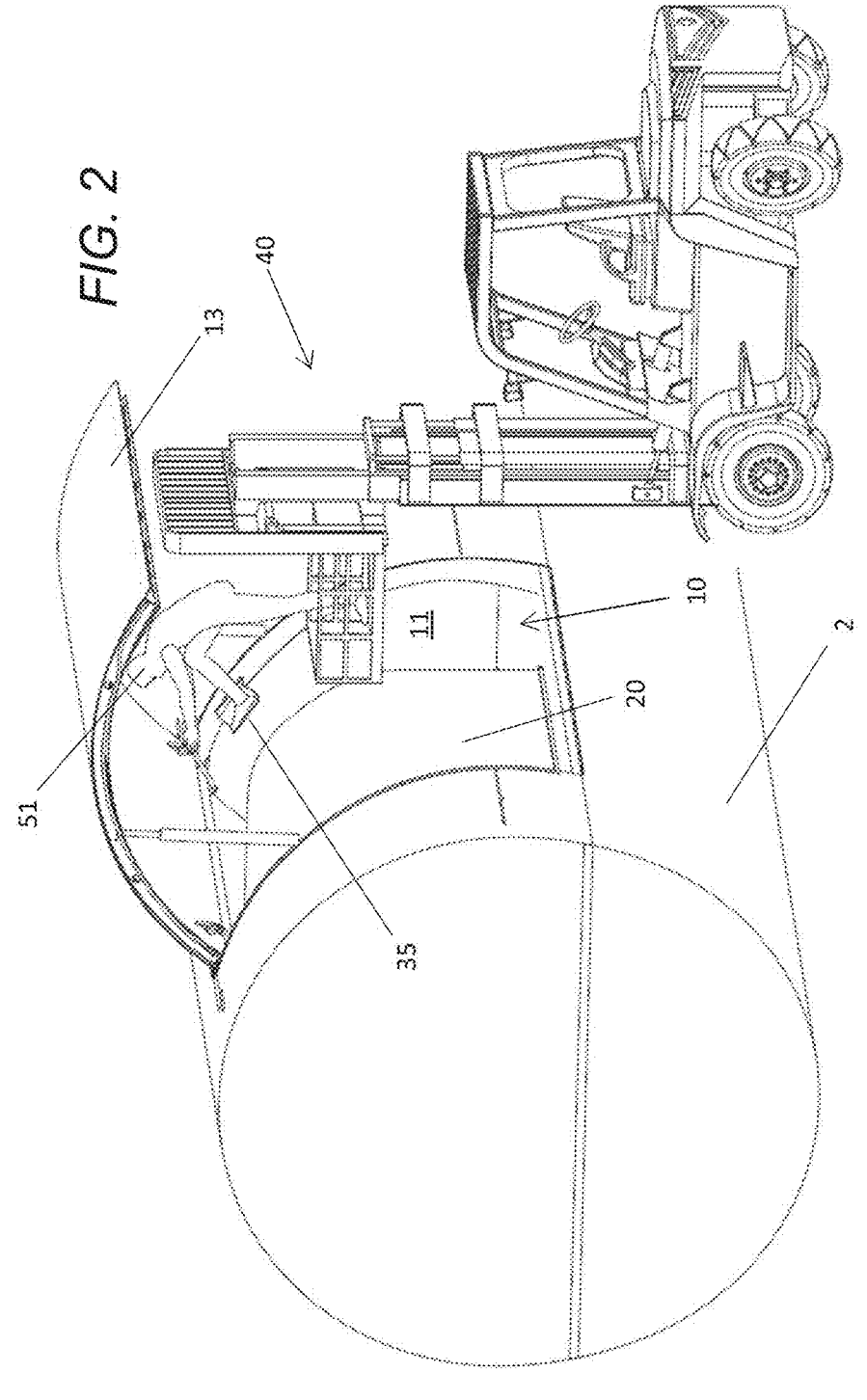
FIG. 2 is an isometric view showing the cargo door in a canopy position.

A freighter aircraft 1 shown in FIG. 1 comprises a fuselage 2 and a pair of wings 3. As shown in FIG. 2, the fuselage 2 has an opening 10 into a cargo bay 11. A cargo door 13 covers the opening 10 when it is in the closed position shown in FIG. 1.

An actuation system is configured to open the cargo door, enabling cargo 20 (shown in FIGS. 2 and 3) to be loaded into, or unloaded from, the cargo bay 11.

Figure 3:
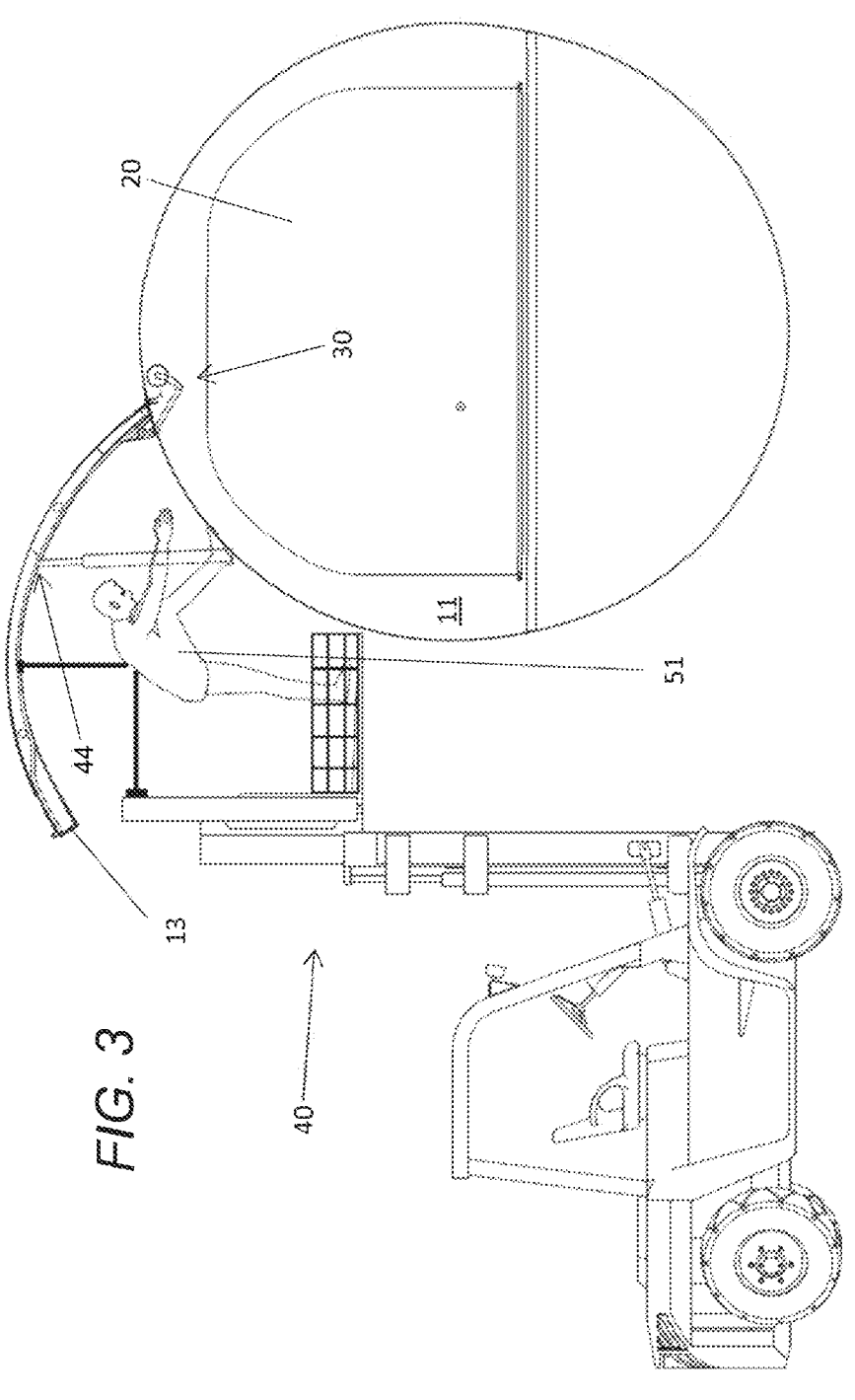
FIG. 3 is a sectional view showing the cargo door in the canopy position.
Figure 4:
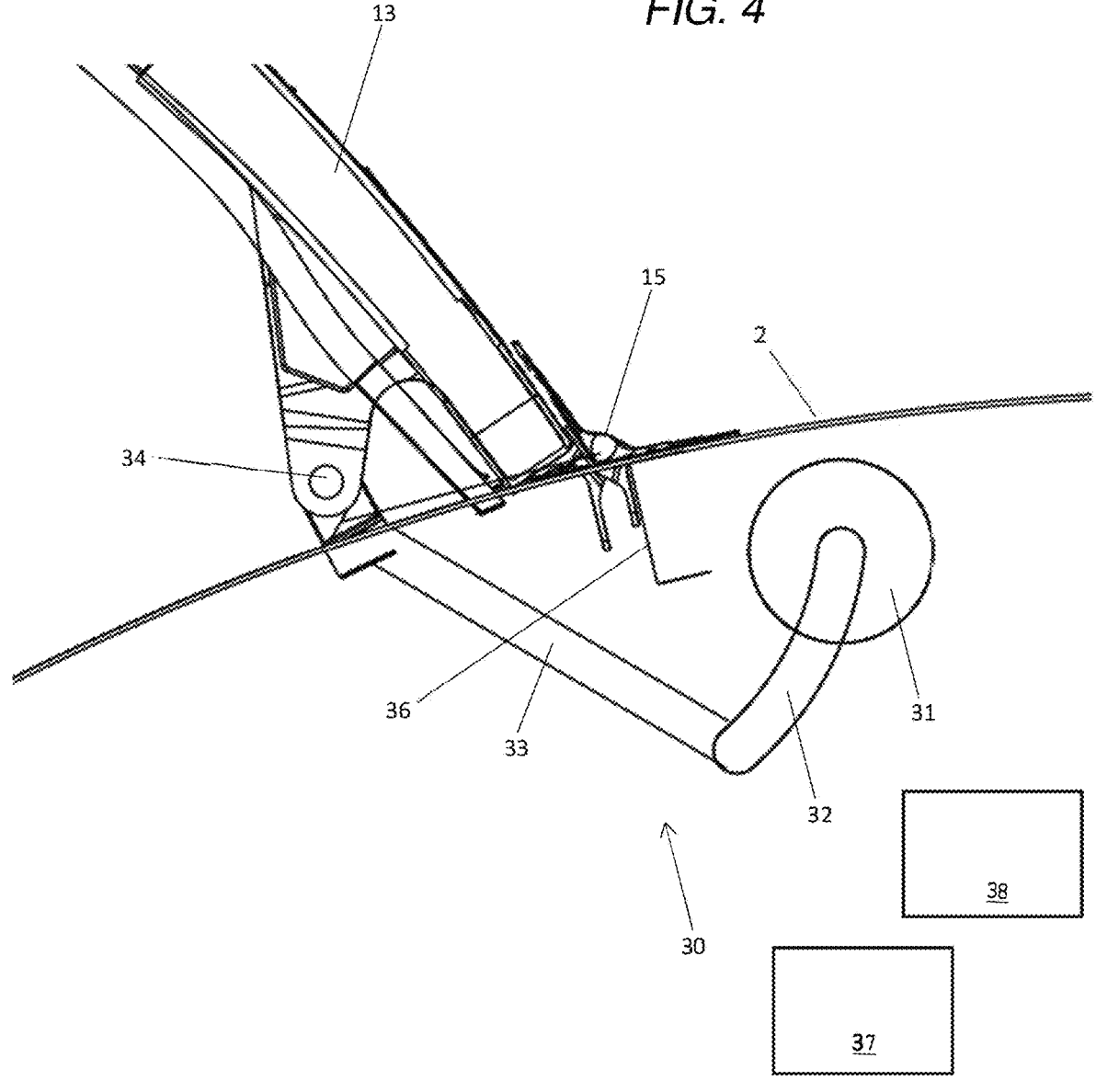
FIG. 4 shows the first actuator in detail.

The actuation system comprises a first actuator 30 shown in FIG. 4. The first actuator 30 is configured to outwardly rotate the cargo door 13 from the closed position of FIG. 1, in which it covers the opening 10, to a first open position shown in FIGS. 2-4. The cargo door 13 is configured to rotate about a hinge pin which defines a hinge line 15 shown in FIG. 4.

The first open position of FIGS. 2-4 is conventionally known as a "canopy position", providing an overhang over the opening 10. Typically the cargo door rotates by more than 40 degrees, more than 50 degrees or more than 60 degrees from the closed position to the first open position. The term "canopy position" will be used below to refer to the first open position. By way of example, the cargo door may rotate by about 70 degrees between the closed position and the canopy position.

The first actuator 30 comprises a rotary actuator 31 shown in FIG. 4. The rotary actuator 31 is mounted to the fuselage 2 and has a crank arm 32 pivotally connected to a link 33 which is pivotally coupled to the cargo door 13 by a pivot pin 34 at a first location near the hinge line 15. The rotary actuator 31 is configured to receive electrical power from a power source 37 shown schematically in FIG. 4. The electrical power is used by the first actuator 30 to rotate the cargo door 13. The power source 37 may be carried by the aircraft or not carried by the aircraft (for instance it may be a ground power unit). The rotary actuator 31 rotates the crank arm 32, which causes the cargo door 13 to rotate about the hinge line 15.

The first actuator 30 is controlled by a first control signal from a control unit 38. The control unit 38 may be carried by the aircraft or not carried by the aircraft (for instance it may be part of a ground power unit).

During normal operation of the aircraft 1, the cargo 20 can be loaded or unloaded by specialised equipment which does not clash with the cargo door 13 when the cargo door 13 is in the canopy position. In an emergency the aircraft may land at an airport without such specialised equipment, where a fork-lift must be used instead. When the cargo door 13 is in the canopy position, there is a risk of the fork-lift clashing with the cargo door 13.

A solution to avoid such a clash would be to use a larger actuator capable of opening the cargo door further beyond the canopy position, such as the actuator disclosed in U.S. Pat. No. 6,457,675B1. Disadvantages of such a solution are that such an actuator is likely to be heavier, and it may clash with a lintel 36 shown in FIG. 4.

The following method is used to open the cargo door 13 beyond the canopy position, without requiring modification of the first actuator 30 or removal of the lintel 36.

In a first step, the cargo door 13 is rotated outwardly by the first actuator 30 from the closed position to the canopy position.

Figure 7:
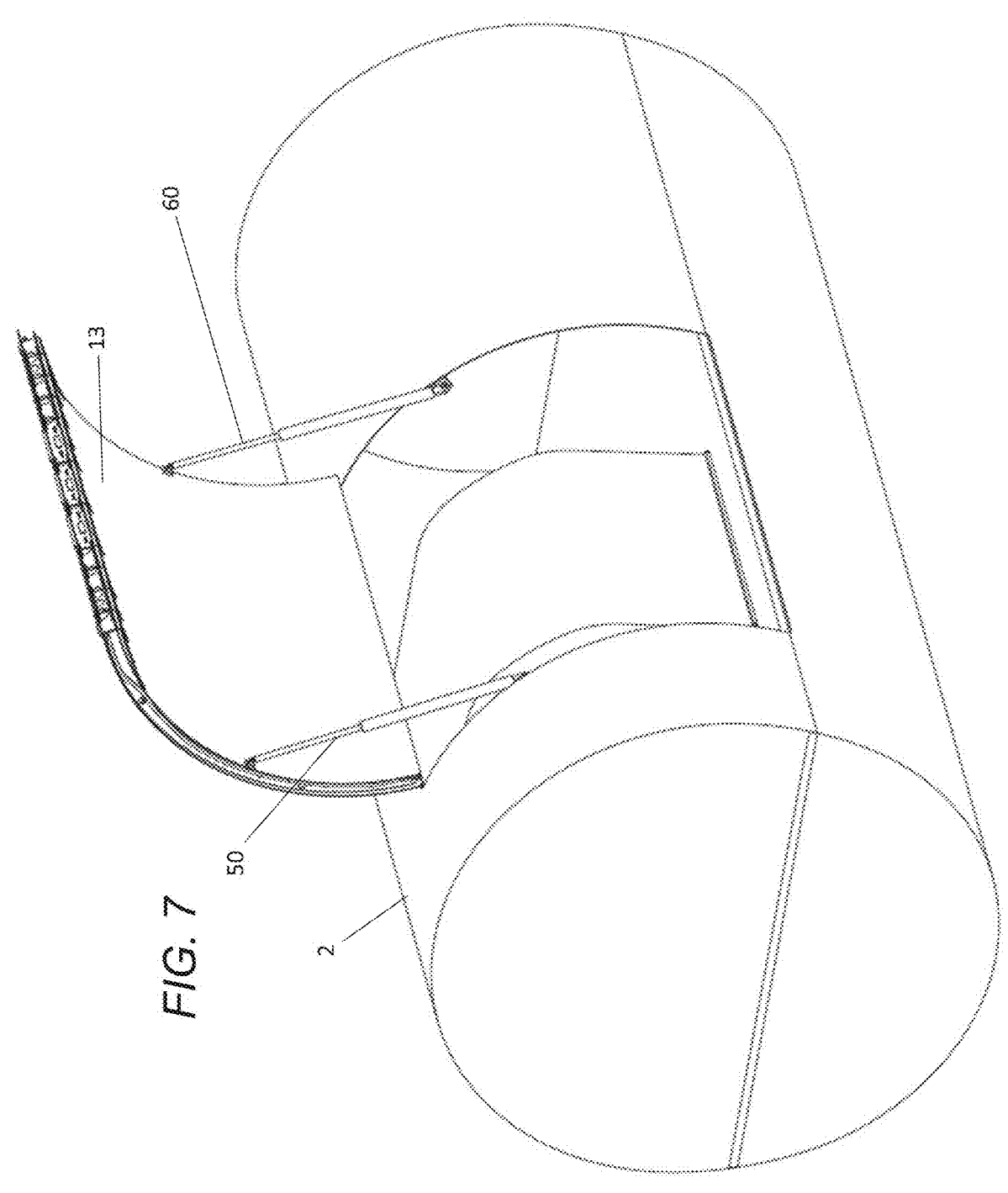
FIG. 7 shows the cargo door in a second open position, with the gas-stay and actuation rods shown.

Next, a gas-stay rod 50 shown in FIG. 7 is installed by an operator 51 at the forward edge of the cargo door.

During the installation process, the operator 51 is lifted to the required position by a fork-lift 40 shown in FIGS. 2 and 3.

The aircraft comprises a footrest 35 which can be stepped on by the operator 51 when the cargo door 13 is in the canopy position, as shown in FIG. 2.

Figures 5, 6:
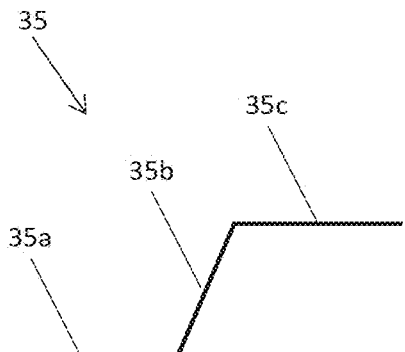
FIG. 5 shows a footrest in an unfolded configuration.
FIG. 6 shows the footrest in a folded configuration.

The footrest 35 can be moved relative to the fuselage between an extended configuration shown in FIG. 2, and a retracted configuration. By way of example, the footrest 35 may have a Z-shaped profile shown in FIGS. 5 and 6, with three parts 35*a*, 35*b*, 35*c* which can be folded about hinges. In FIG. 5 the footrest 35 is in an extended (unfolded) configuration and in FIG. 6 the footrest 35 is in a retracted (folded) configuration. The footrest 35 may be mounted on a sliding bearing so it can be slid away from the opening 10 when not in use.

In an alternative embodiment, instead of providing a footrest 35 permanently carried by the aircraft, the operator 51 may bring a separate footrest to the aircraft which they mount to the fuselage 2.

Optionally the operator 51 may be attached to the cargo door and the fork-lift 40 by harness lines shown in FIG. 3, to provide a further safety feature.

The gas-stay rod 50 is a passive device designed to support half the weight of the cargo door 13 without actively driving rotation of the cargo door. In other words, the gas-stay rod 50 is not an actuator. The gas-stay rod 50 is installed by coupling a first end of the gas-stay rod to the fuselage 2 and coupling a second end of the gas-stay rod to the cargo door 13. The gas stay rod 50 is in equilibrium with the weight of the cargo door.

In the next step, an actuator rod 60 shown in FIG. 7 is installed by coupling a first (lower) end of the actuator rod 60 to the fuselage 2 and coupling a second (upper) end of the actuator rod 60 to the aft edge of the cargo door 13.

Figure 8:
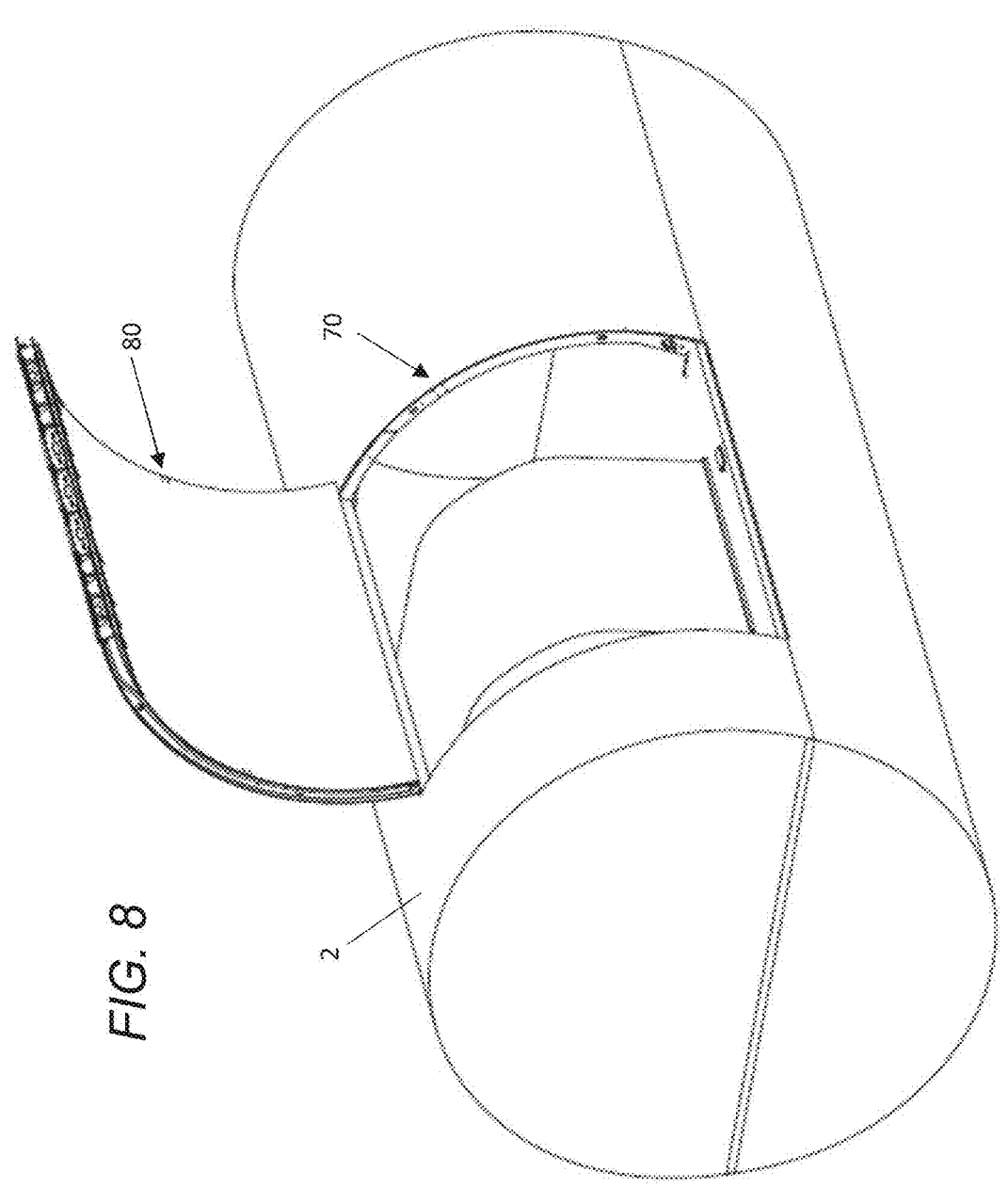
FIG. 8 shows the cargo door in the second open position, with the gas-stay and actuation rods omitted so the fastener holes can be seen.

A first rod coupling feature (in this case a set of four fastener holes 70 shown in FIGS. 8 and 9) is provided in the fuselage 2, at the aft edge of the opening 10. The fastener holes 70 are configured to couple the first (lower) end of the actuator rod 60 to the fuselage 2, as shown in FIG. 11.

The actuator rod 60 comprises a rod body 61*a* shown in FIG. 11, and a first bracket 62 with a clevis 63 and clevis pin 64. The first end of the actuator rod is coupled to the fuselage 2 by attaching the bracket 62 to the fuselage as shown in FIG. 10 with fasteners 65 which pass through the bracket 62 and the fastener holes 70; then coupling the rod body 61*a* to the bracket 62 by passing the clevis pin 64 through the clevis 63 and the lower end of the rod body 61*a* as shown in FIG. 11.

A similar arrangement may be provided in the fuselage, at the forward edge of the opening 10, to couple the first (lower) end of the gas-stay rod 50 to the fuselage 2.

Optionally the bracket 62 may be replaced by an alternative bracket which provides a ball-and-socket joint rather than a pin-joint.

Optionally the fastener holes 70 may be sealed by temporary inserts (such as HI-LITE™ pins, blind rivets or grommets) which are removed before inserting the fasteners 65.

In this example, the first rod coupling feature is a set of fastener holes 70. In other examples, the first rod coupling feature may take a different form, for instance it may comprise a reinforced socket into which the first (lower) end of the actuator rod 60 is plugged to couple the actuator rod 60 to the fuselage 2.

A second rod coupling feature (in this case a set of four fastener holes 80 shown in FIGS. 8 and 12) is provided at the aft edge of the cargo door 13. The fastener holes 80 are configured to couple the second (upper) end of the actuator rod 60 to the cargo door 13, as shown in FIG. 14. The actuator rod 60 comprises an actuator arm 61*b* shown in FIG. 14, and a second bracket 82 with a clevis 83 and clevis pin 84. The second (upper) end of the actuator rod is coupled to the cargo door 13 by attaching the bracket 82 to the cargo door as shown in FIG. 13 with fasteners 85 which pass through the bracket 82 and the fastener holes 80; then coupling the actuator arm 61*b* to the bracket 82 by passing the clevis pin 84 through the clevis 83 and the upper end of the actuator arm 61*b* as shown in FIG. 14.

A similar arrangement may be provided in the forward edge of the cargo door, to couple the second (upper) end of the gas-stay rod 50 to the cargo door.

Optionally the bracket 82 may be replaced by an alternative bracket which provides a ball-and-socket joint rather than a pin-joint.

Optionally the fastener holes 80 may be sealed by temporary inserts (such as HI-LITE™ pins, blind rivets or grommets) which are removed before inserting the fasteners 85.

In this example, the second rod coupling feature is a set of fastener holes 80. In other examples, the second rod coupling feature may take a different form, for instance it may comprise a reinforced socket into which the second (upper) end of the actuator rod 60 is plugged to couple the actuator rod 60 to the cargo door.

The symmetrical arrangement shown in FIG. 7, with a pair of rods 50, 60 supporting the cargo door 13 at its forward and aft edges, avoids twisting of the cargo door 13.

In this example the actuator rod 60 is at the forward edge of the cargo door and the gas-stay rod 50 is at the aft edge. This arrangement may be reversed if needed.

Figure 15:
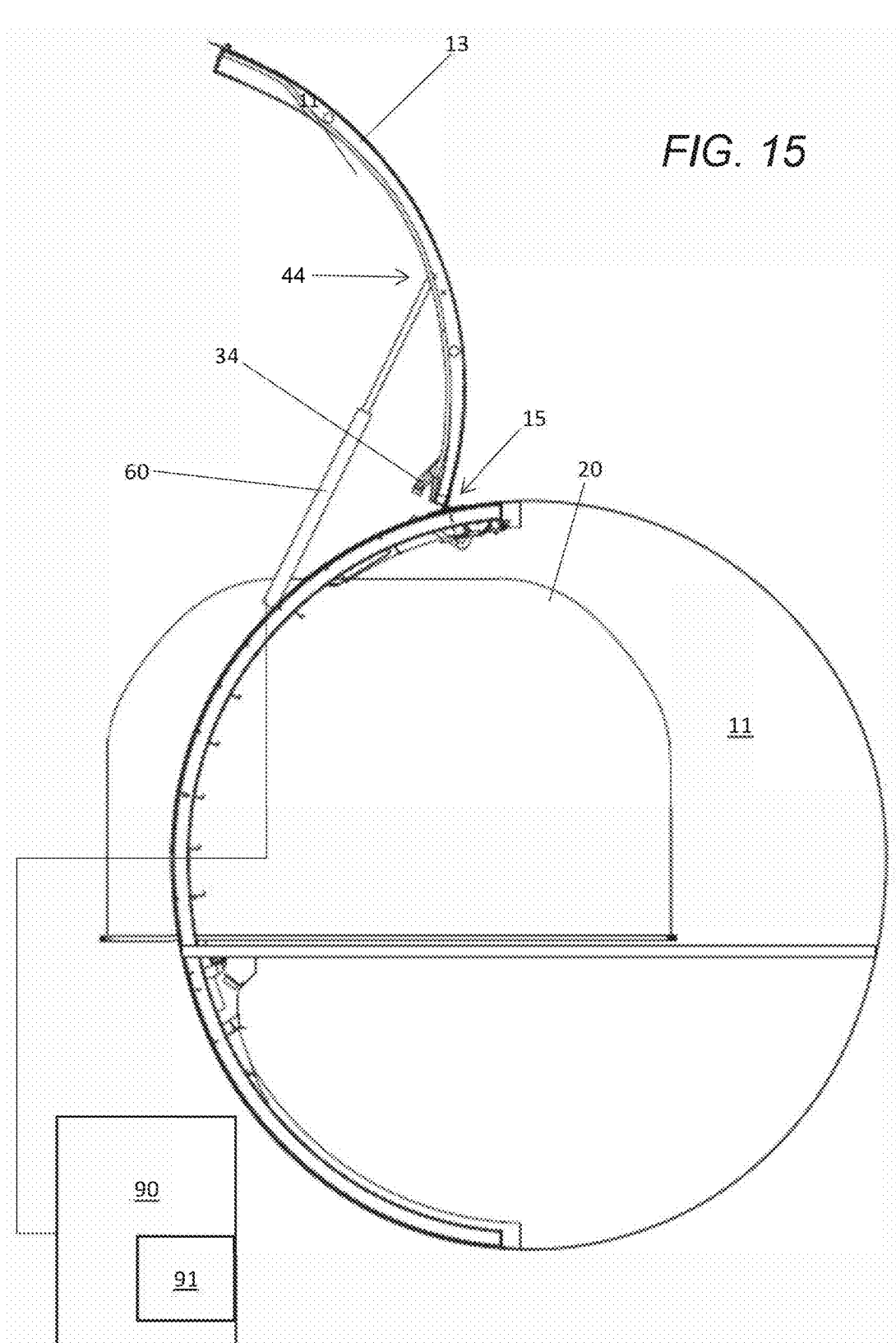
FIG. 15 shows the cargo door in the second open position, with cargo partially removed.
Figure 16:
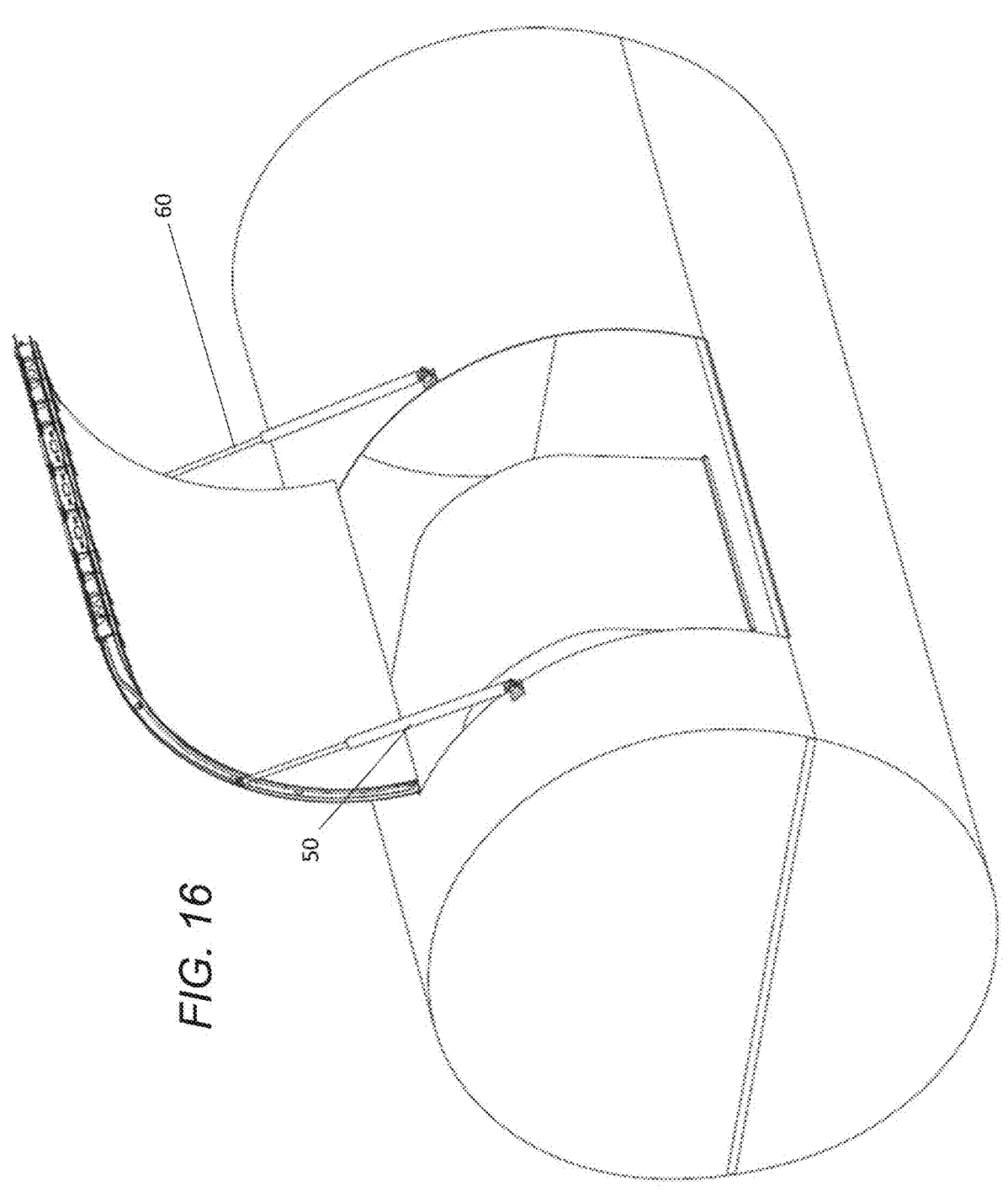
FIG. 16 shows the cargo door in the second open position, with the gas-stay and actuation rods attached differently compared with FIG. 7.

As shown in FIG. 15, the second rod coupling feature (i.e. the set of fastener holes 80) is positioned at a second location 44 which is further from the hinge line 15 than the first location of the pivot pin 34. This enables the fastener holes 80 to be accessed easily by the operator 51.

Next the first actuator 30 is disconnected from the cargo door 13 by the operator 51. The first actuator 30 may be disconnected by removing the pivot pin 34 to disconnect the link 33 from the cargo door 13, or by disconnecting the link 33 from the crank arm 32, or by disconnecting the crank arm 32 from the rotary actuator 31. The two rods 50, 60 now support the full weight of the cargo door.

In other embodiments, the first actuator 30 may not need to be disconnected from the cargo door 13.

In the next step, a ground power unit (GPU) 90, schematically shown in FIG. 15, is coupled to the actuator rod 60.

The GPU 90 is then operated to supply electrical power to the actuator rod 60, causing the actuator rod 60 to outwardly rotate the cargo door 13 further from the canopy position to a second open position shown in FIGS. 7 and 15, in which the cargo door is generally upright.

The actuator rod 60 may be controlled by a second control signal from a second control unit 91. The second control unit 91 may be carried by the aircraft or not carried by the aircraft (in this case it is part of the GPU 90).

In the second open position, the cargo door 13 is lifted sufficiently high to avoid any risk of clash with the fork-lift 40, or a larger fork-lift with a higher mast which may be required to unload the cargo. Typically the cargo door rotates by more than 30 degrees or more than 40 degrees from the first open position to the second open position.

Typically a total rotation from the closed position to the second open position is more than 100 degrees or more than 110 degrees.

By way of example, the cargo door may rotate by about 53 degrees between the canopy position and the second open position, so the total rotation is about 123 degrees.

Optionally the actuator rod 60 may have a large enough stroke length to open the cargo door 13 further beyond the second position of FIG. 15 so that the cargo bay can be accessed from above by a crane.

The first actuator 30 is unable to rotate the cargo door to the second open position because the crank arm 32 or the link 33 may clash with a lintel 36 shown in FIG. 4. In this example, the first actuator 30 is actively decoupled from the cargo door before operation of the actuator rod 60, to avoid such a clash.

The actuator rod 60 is a linear actuator which rotates the cargo door by increasing a distance between the first and second ends of the actuator rod 60. In this example the actuator rod 60 is a screw jack which is powered by electrical power from the GPU 90. In other examples the actuator rod 60 may be a hydraulic jack driven by a hydraulic power source, or it may be manually powered by the operator 51.

The distance of the second location 44 from the hinge line 15 is chosen based on the length of the actuator rod 60 and the power that can be delivered by the GPU 90.

The actuators 30, 60 are configured to receive power from different and independent power sources 35, 90, although in other embodiments they may receive power from the same power source.

The actuators 30, 60 are configured to be controlled independently of each other. That is, the first actuator 30 is configured to be controlled by a first control signal and the actuator rod 60 is configured to be controlled by a different second control signal. The first and second control signals may be generated by different control units 36, 91; or by a common control unit.

The actuator rod 60 is typically powered by a power source (for instance the GPU 90) not carried by the aircraft. This is beneficial since after an emergency landing, the aircraft may have a damaged landing gear and it may be recommended not to use aircraft systems. Also, it makes it unnecessary to design connections in the aircraft to deliver power to the actuator rod 60—such connections adding complexity and weight.

Neither the gas-stay rod 50 nor the actuator rod 60 are carried by the aircraft in flight. This minimizes the weight of the aircraft in flight. After an emergency landing, the operator 51 travels to the airport with the rods 50, 60 and any other equipment needed to open the cargo door and remove the cargo.

FIGS. 16 to 22 show an alternative embodiment in which the fastener holes 70, 80 are in different locations. All other aspects are the same as in the previous embodiment, so will not be described again.

In the case of FIG. 9, the fastener holes 70 are provided in the forward face of a door frame at the aft edge of the opening 10. In the case of FIG. 17, the fastener holes 70 are provided in the outer face of the fuselage 2 at the aft edge of the opening 10.

Figures 20, 21:
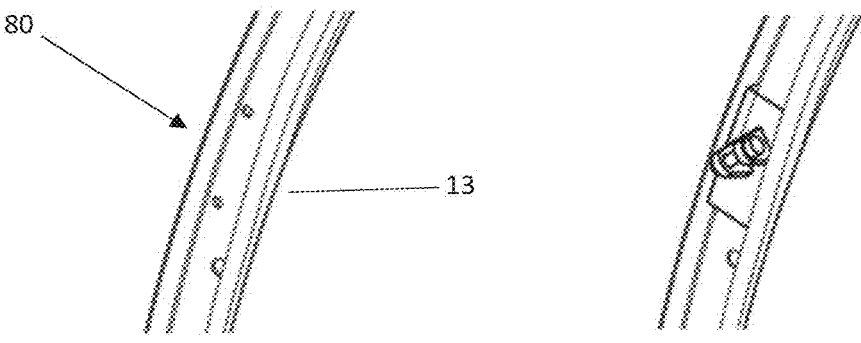
FIG. 20 shows fastener holes in the edge of the cargo door.
FIG. 21 shows a second bracket attached to the cargo door.
Figure 22:
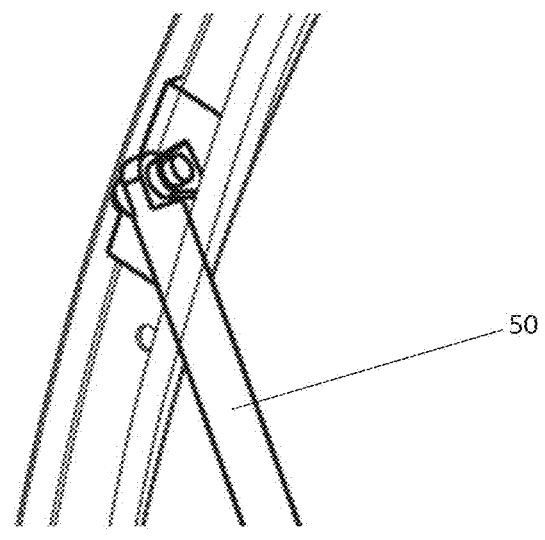
FIG. 22 shows the interface between the second end of the actuator rod and the cargo door.

In the case of FIG. 12, the fastener holes 80 are provided in the inner face of the cargo door. In the case of FIG. 20, the fastener holes 80 are provided in the outer edge of the cargo door 13. Note that FIGS. 20-22 shows the coupling arrangement at the upper end of the gas-stay rod 50 at the forward edge of the cargo door. A similar arrangement may be provided for the actuator rod 60 at the aft edge of the cargo door.

Note that in the example of FIG. 20 there are only two fastener holes 80, rather than four in the case of FIG. 12. The number of holes may vary from 1-10 depending on the weight of the cargo door, the wind conditions and availability of the standard equipment in the market.

FIGS. 23-28 show a cargo door actuation system according to a second embodiment of the invention. Certain elements in FIGS. 23-28 have equivalents in FIGS. 2-22, and in this case the same reference number is used.

Figures 23, 24:
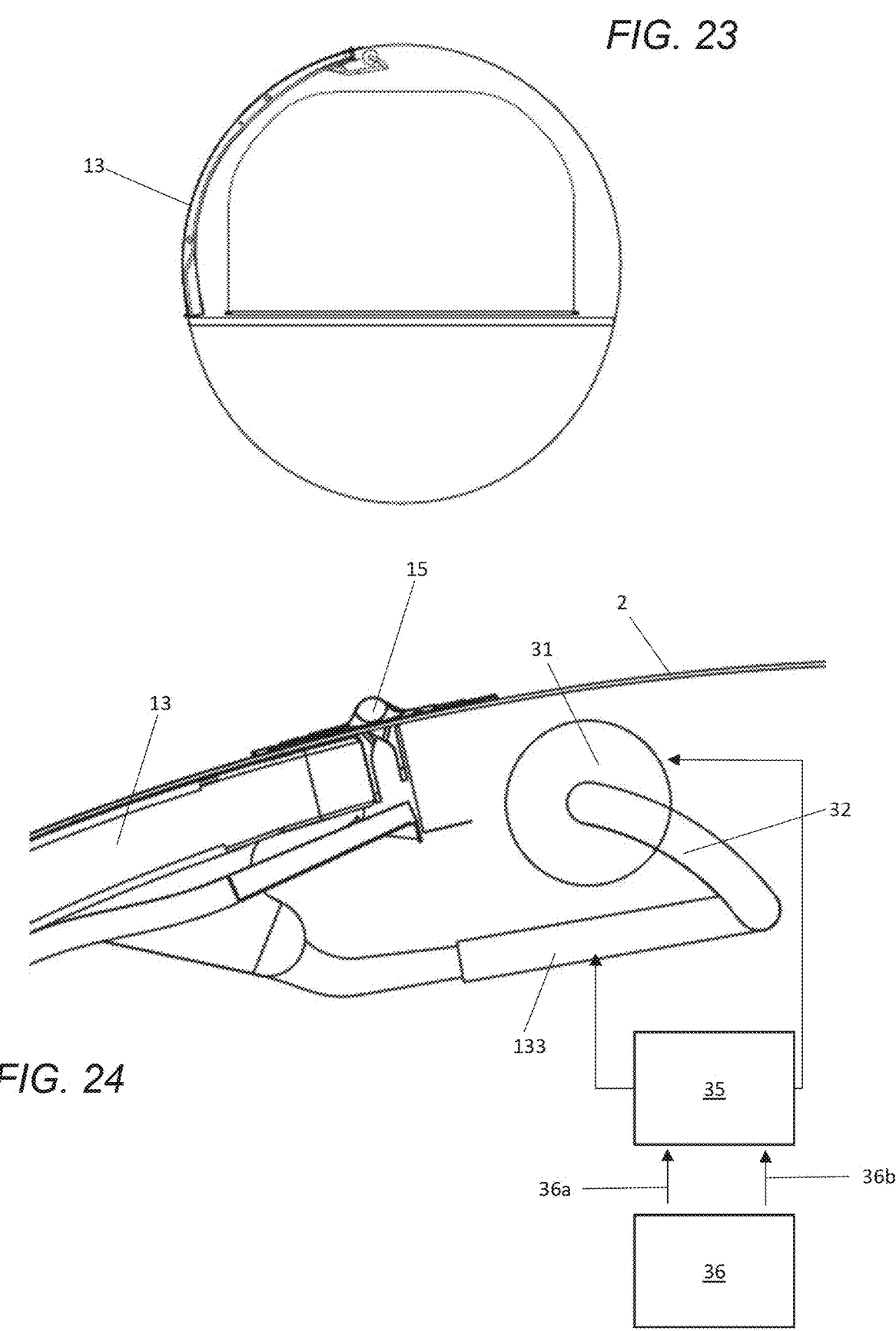
FIG. 23 shows an aircraft according to a further embodiment of the invention with a cargo door in a closed position.
FIG. 24 shows an actuation system of the cargo door of FIG. 23, with the door in the closed position.
Figure 25:
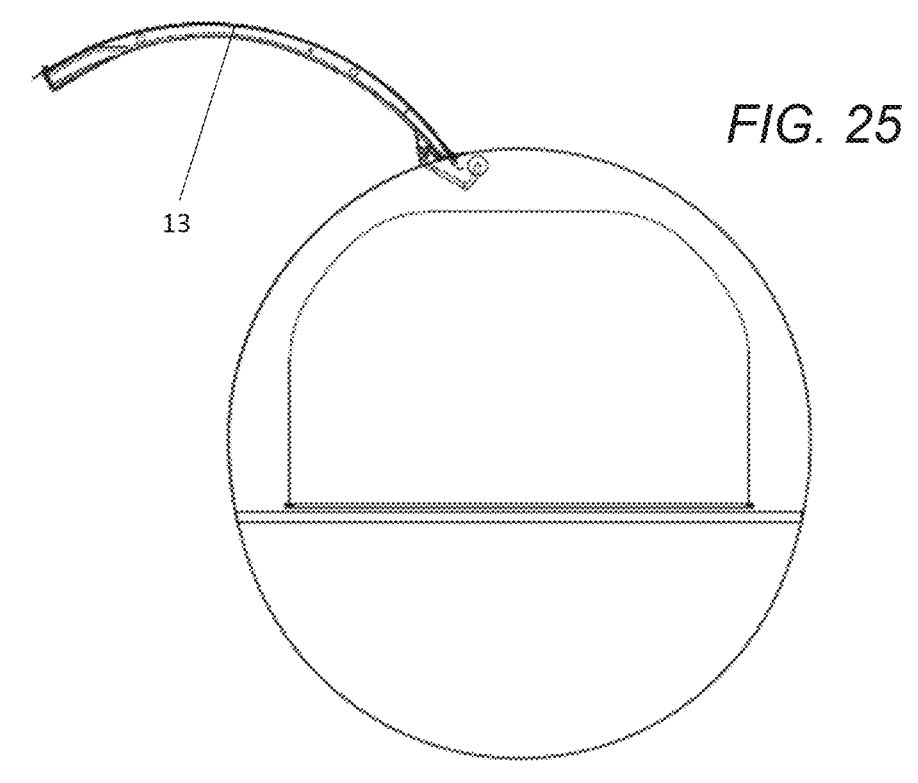
FIG. 25 shows the cargo door in a canopy position.

The actuation system comprises a rotary actuator 31 configured to outwardly rotate the cargo door 13 from the closed position of FIGS. 23/24, in which it covers the opening 10, to a first open position (or "canopy" position)

shown in FIGS. 25/26. As in the previous embodiment, the cargo door 13 is configured to rotate about a hinge line 15.

Typically the cargo door rotates by more than 40 degrees, more than 50 degrees or more than 60 degrees from the closed position to the first open position.

Figure 26:
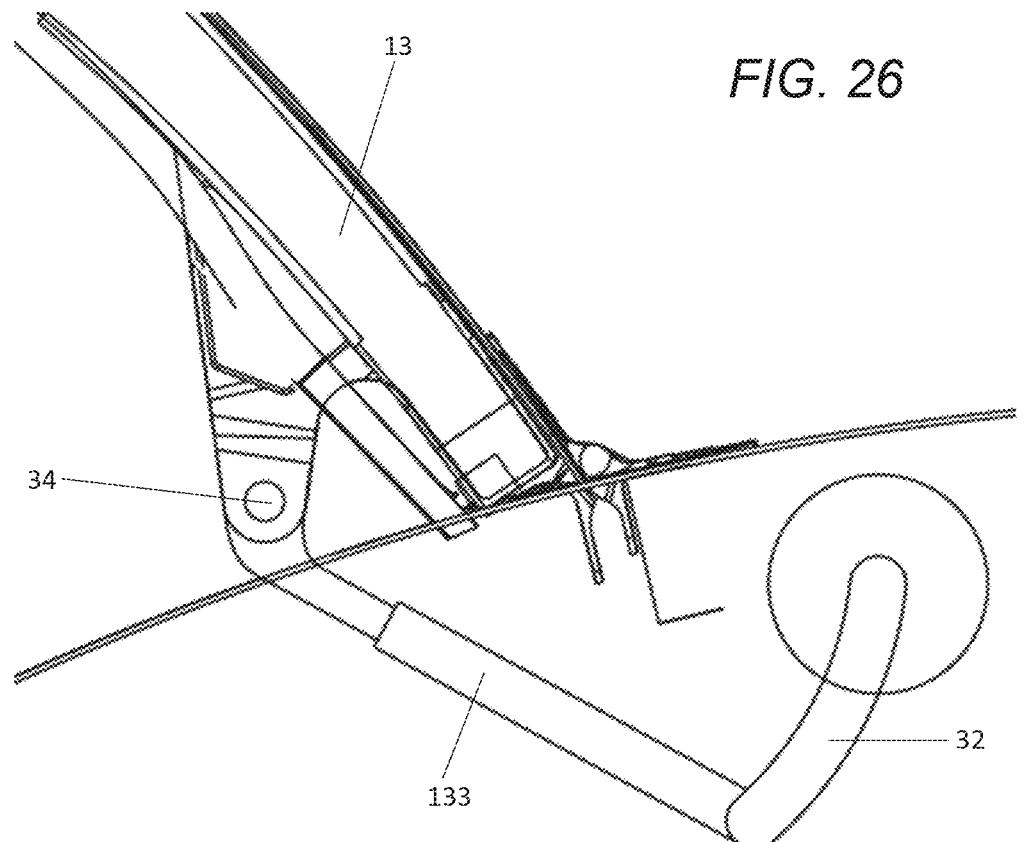
FIG. 26 shows the actuation system with the cargo door in the canopy position.

The rotary actuator 31 is mounted to the fuselage 2 and has a crank arm 32 pivotally connected to a linear actuator 133 which is pivotally coupled to the cargo door 13 by a pivot pin 34 shown in FIG. 26.

The linear actuator 133 is configured to outwardly rotate the cargo door independently of the rotary actuator 31.

The rotary actuator 31 is configured to receive electrical power from a power source 37 which can be used by the rotary actuator 31 to rotate the cargo door. The power source 37 may be carried by the aircraft or not carried by the aircraft (for instance it may be part of a ground power unit). The rotary actuator 31 rotates the crank arm 32, which causes the cargo door 13 to rotate about the hinge line 15 from the closed position of FIGS. 23/24 to the canopy position of FIGS. 25/26.

The rotary actuator 31 may be controlled by a first control signal 36*a* from a control unit 38. The control unit 38 may be carried by the aircraft or not carried by the aircraft (for instance it may be part of a ground power unit).

As shown in FIG. 26, the linear actuator 133 has a first end coupled to the crank arm 32 of the rotary actuator 31 and a second end coupled to the cargo door 13 by the pivot pin 34. The rotary actuator 31 is configured to rotate the cargo door by rotating the first end of the linear actuator 133; and the linear actuator 133 is configured to further rotate the cargo door 13 by increasing a distance between its first and second ends.

Figures 27, 28:
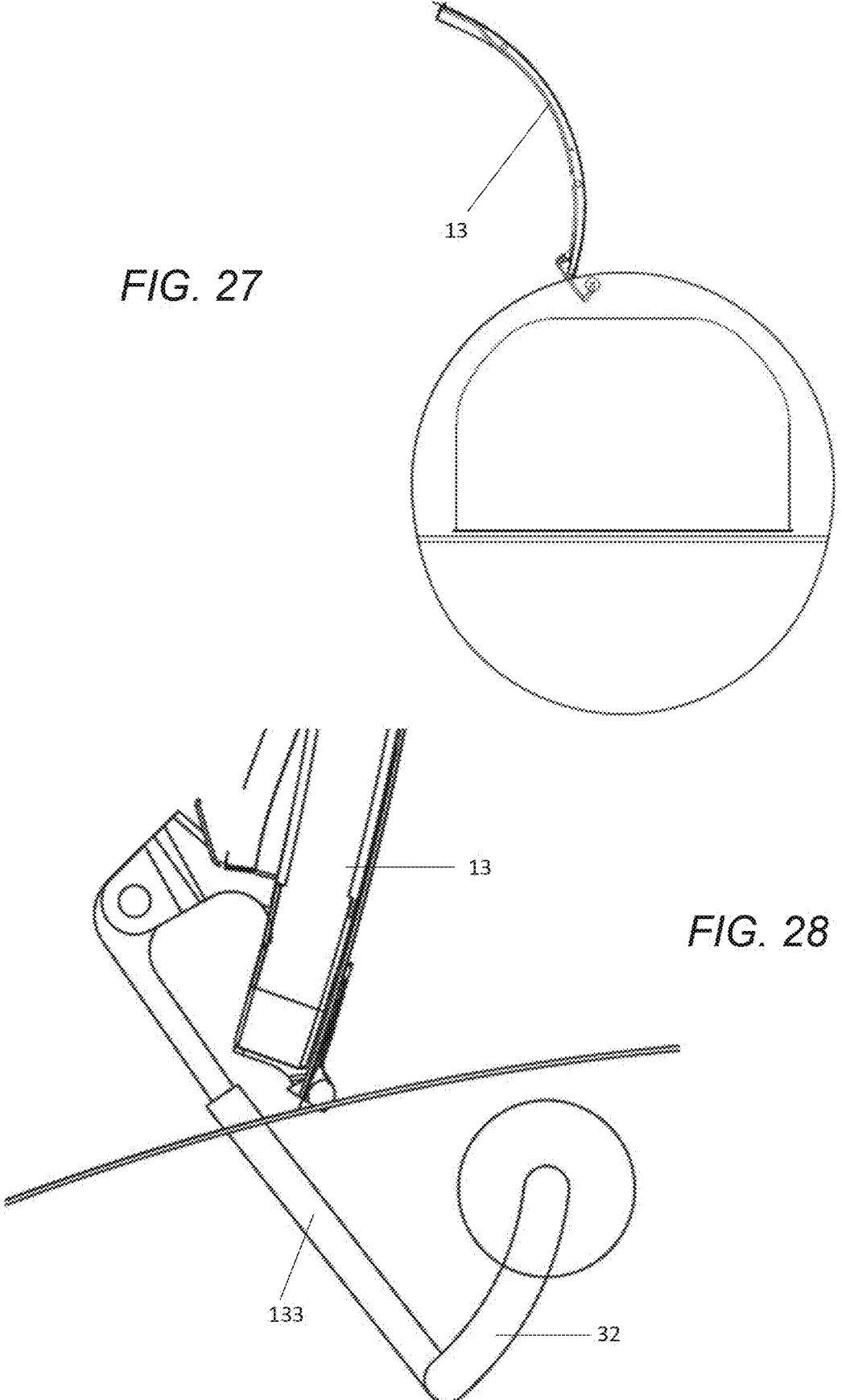
FIG. 27 shows the cargo door in a second open position.
FIG. 28 shows the actuation system with the cargo door in the second open position.

The linear actuator 133 is configured to outwardly rotate the cargo door 13 from the canopy position of FIGS. 25/26 to the second open position of FIGS. 27/28. Comparing these two positions: the crank arm 32 has not moved, but the linear actuator 133 has changed in length.

Typically the cargo door rotates by more than 30 degrees or more than 40 degrees from the first open position to the second open position.

Typically a total rotation from the closed position to the second open position is more than 100 degrees or more than 110 degrees.

By way of example, the cargo door may rotate by about 53 degrees between the canopy position and the second open position, so the total rotation is about 123 degrees.

In this example the linear actuator 133 is an electrical linear actuator which is powered by electrical power from an electric power source 37. For example the linear actuator 133 may be electrically controlled by a solenoid. In other examples the linear actuator 133 may be a hydraulic jack driven by a hydraulic power source, a pneumatic jack driven by a pneumatic power source or it may be manually powered by the operator 51.

The linear actuator 133 may be controlled by a second control signal 36*b* from the control unit 38.

The actuators 31, 133 are configured to be controlled independently of each other. That is, the rotary actuator 31 is configured to be controlled by a first control signal 36*a* and the linear actuator 133 is configured to be controlled by a different second control signal 36*b*. In this case the first and second control signals 36*a*, 36*b* are generated by a common control unit 38.

An advantage of the actuation system of FIGS. 23-28, compared with the actuation system of FIGS. 2-22, is that it is not necessary to remove the pivot pin 34 before operating the linear actuator 133.

The linear actuator 133 is configured to be inactive as the rotary actuator 31 outwardly rotates the cargo door, and the rotary actuator 31 is configured to be inactive as the linear actuator 133 outwardly rotates the cargo door. Hence the actuators 31, 133 may be powered one after the other, so that only one actuator is rotating the cargo door 13 at any given time. This is preferred because it avoids the rotary actuator 31 being subjected to high loads. To that end, the rotary actuator 31 may be rotationally locked by a suitable locking device (not shown) when the cargo door 13 is in the canopy position of FIGS. 25/26, so the rotary actuator 31 does not rotate as the linear actuator 133 outwardly rotates the cargo door.

Alternatively, the actuators 31, 133 may be powered at the same time, so they rotate the cargo door 13 in tandem.

The actuators 31, 133 may be configured to receive power from different and independent power sources, or they may receive power from a common power source 37.

The actuators 31, 133 may be controlled by a common control unit 38, or they may be controlled by different control units.

One or both actuators 31, 133 are typically powered by a power source (for instance the GPU 90) not carried by the aircraft. This is beneficial since after an emergency landing, the aircraft may have a damaged landing gear and it may be recommended not to use aircraft systems. Also, it makes it unnecessary to design connections in the aircraft to deliver power to the rotary actuator 31 and/or to the linear actuator 133—such connections adding complexity and weight.

Unlike the gas-stay rod 50 and actuator rod 60 of the previous embodiment, the linear actuator 133 is carried by the aircraft in flight.

In this example the rotary actuator 31 is configured to outwardly rotate the cargo door to the canopy position, and the linear actuator 133 is configured to outwardly rotate the cargo door 13 from the canopy position to the second open position. In other embodiments this arrangement may be reversed, so the linear actuator 133 is configured to outwardly rotate the cargo door to the canopy position, and the rotary actuator 31 is configured to outwardly rotate the cargo door 13 from the canopy position to the second open position.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An actuation system for a cargo door of an aircraft, the actuation system comprising:
    a first actuator configured only to outwardly rotate the cargo door by more than 40 degrees from a closed position to a first open position; and
    a second actuator configured only to outwardly rotate the cargo door from the first open position to a second open position;
    wherein the cargo door covers an opening into a cargo bay when the cargo door is in the closed position; and
    wherein the first actuator and the second actuator are configured such that the first and second actuators are not powered simultaneously, such that only one of the first and second actuators operates to move the cargo door at any given time.

2. The actuation system according to claim 1, wherein the first actuator is configured to receive power from a power source that is different and independent from a power source from which the second actuator is configured to receive power.

3. The actuation system according to claim 1, further comprising:
    a first power source configured to supply power to the first actuator to outwardly rotate the cargo door between the closed position and the first open position;
    wherein the second actuator is configured to receive power from a second power source to outwardly rotate the cargo door between the first open position and the second open position.

4. The actuation system according to claim 3, wherein the first power source is configured for being carried by the aircraft and the second power source is configured for not being carried by the aircraft.

5. The actuation system according to claim 1, wherein:
    the first actuator comprises a rotary actuator; and
    the second actuator comprises a linear actuator.

6. The actuation system according to claim 5, wherein:
    the linear actuator has:
        a first end coupled to the rotary actuator; and
        a second end coupled to the cargo door;
    the rotary actuator is configured to rotate the cargo door between the closed position and the first open position by moving the first end of the linear actuator; and
    the linear actuator is configured to rotate the cargo door from the first open position to the second open position by increasing a distance between the first end of the linear actuator and the second end of the linear actuator.

7. The actuation system according to claim 1, wherein the first actuator is configured to receive electrical power from an electrical power source to rotate the cargo door between the closed position and the first open position.

8. The actuation system according to claim 1, wherein the second actuator is configured to receive electrical power from an electrical power source to rotate the cargo door between the first open position and the second open position.

9. The actuation system according to claim 1, wherein the first actuator is configured for being controlled independently of the second actuator.

10. An aircraft comprising:
    a cargo door; and
    the actuation system according to claim 1;
    wherein the actuation system is configured to open the cargo door.

11. The aircraft according to claim 10, further comprising:
    a body with an opening into a cargo bay of the aircraft;
    wherein the cargo door covers the opening when the cargo door is in the closed position.

12. The aircraft according to claim 10, further comprising:
    a first power source configured to supply power to the first actuator to outwardly rotate the cargo door towards the first open position;
    wherein the second actuator is configured to receive power from a second power source not carried by the aircraft.

13. The aircraft according to claim 10, wherein the first and second actuators are configured to be carried by the aircraft in flight.

14. A method of opening a cargo door of an aircraft with an actuation system for the cargo door, the actuation system comprising:
    a first actuator; and
    a second actuator:

the method comprising:

outwardly rotating, using the first actuator, the cargo door by more than 40 degrees, from a closed position to a first open position;

then outwardly rotating, using the second actuator, the cargo door from the first open position to a second open position;

wherein the cargo door covers an opening into a cargo bay when the cargo door is in the closed position; and wherein the first actuator and the second actuator are not powered simultaneously, such that only one of the first and second actuators operates to move the cargo door at any given time.

15. The method according to claim 14, wherein the first actuator receives power from a power source that is different and independent from a power source from which the second actuator receives power.

16. The method according to claim 14, wherein:

the first actuator receives power from a first power source to rotate the cargo door between the closed position and the first open position; and the second actuator receives power from a second power source to rotate the cargo door between the first open position and the second open position.

17. The method according to claim 16, wherein the first power source is carried by the aircraft and the second power source is not carried by the aircraft.

18. The method according to claim 14, wherein the first actuator is controlled independently of the second actuator.

19. The method according to claim 18, wherein:

the first actuator is controlled by a first control signal; and the second actuator is controlled by a second control signal.

20. An actuation system for a cargo door of an aircraft, the actuation system comprising:

a rotary actuator configured to outwardly rotate the cargo door between a closed position and a first open position; and a linear actuator configured to outwardly rotate the cargo door between the first open position and a second open position;

wherein the linear actuator has:

a first end coupled to the rotary actuator; and a second end coupled to the cargo door;

wherein the rotary actuator is configured to rotate the cargo door between the closed position and the first open position by moving the first end of the linear actuator;

the linear actuator is configured to rotate the cargo door between the first open position and the second open position by increasing a distance between the first end of the linear actuator and the second end of the linear actuator; and wherein the cargo door covers an opening into a cargo bay when the cargo door is in the closed position.

* * * * *